United States Patent [19]

Danjell

[11] Patent Number: 4,767,477

[45] Date of Patent: Aug. 30, 1988

[54] METHOD FOR MANUFACTURING "NEON LOOK" LIGHTING

[75] Inventor: Barbara Danjell, Columbus, Ohio

[73] Assignee: Danjell Creations, Inc., Columbus, Ohio

[21] Appl. No.: 117,692

[22] Filed: Nov. 5, 1987

Related U.S. Application Data

[63] Continuation-in-part of Ser. No. 782,978, Oct. 1, 1985, Pat. No. 4,711,044.

[51] Int. Cl.[4] ........................ B44F 1/00; C09K 11/00; B24B 1/00; B29C 37/00

[52] U.S. Cl. ........................................ 156/67; 51/310; 156/153; 156/242; 156/297; 156/633; 156/668

[58] Field of Search ............... 156/629, 633, 645, 654, 156/659.1, 668, 61, 63, 67, 153, 154, 242, 297, 299; 40/543; 445/1; 51/281 R, 310, 319, 326

[56] References Cited

U.S. PATENT DOCUMENTS

| | | | |
|---|---|---|---|
| 2,275,602 | 3/1942 | Beck et al. | 156/645 X |
| 2,709,644 | 5/1955 | Gustin | 156/663 X |
| 3,767,516 | 10/1973 | Brady | 156/67 X |
| 3,801,389 | 4/1974 | Fujimura | 156/633 |
| 4,695,336 | 9/1987 | Coburn | 156/67 |

*Primary Examiner*—William A. Powell

*Attorney, Agent, or Firm*—Porter, Wright, Morris & Arthur

[57] ABSTRACT

A method for manufacturing a decorative sign which simulates the appearance of neon lighting is described in which a polymeric fluorescent gel is cast upon and bonded to a panel in a "neon" shape and is luminated by exposure to an activating lamp.

12 Claims, 1 Drawing Sheet

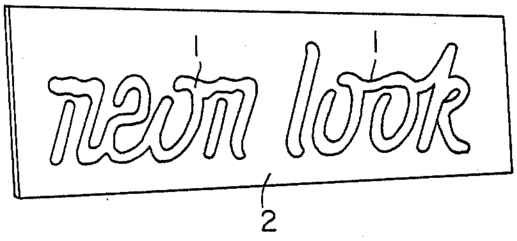
FIG. 1
FIG. 2A
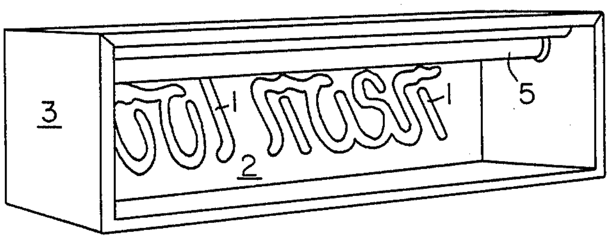
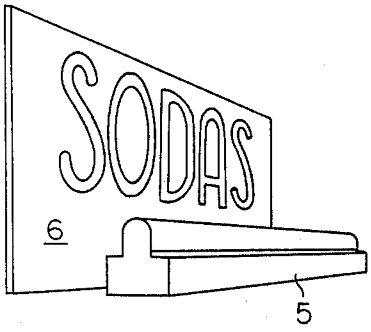
FIG. 2B
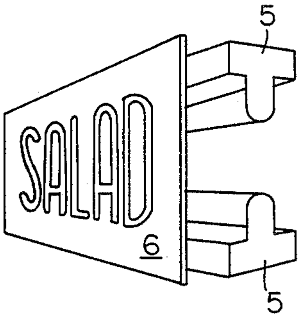
FIG. 2C
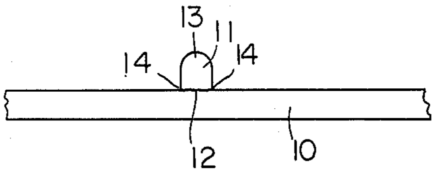
FIG. 3A
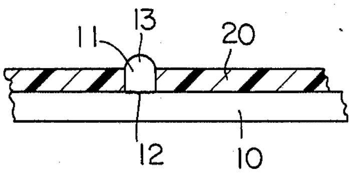
FIG. 3B

METHOD FOR MANUFACTURING "NEON LOOK" LIGHTING

RELATED APPLICATIONS

This application is a continuation-in-part of my co-pending application Ser. No. 06/782,978 filed on Oct. 1, 1985, now U.S. Pat. No. 4,711,044.

FIELD OF THE INVENION

This invention relates to a method for manufacturing a decorative sign which simulates the appearance of neon lighting.

BACKGROUND OF THE PRIOR ART

Neon lighting has become a popular architectural enhancement in many decorating schemes and in commercial sign applications. Neon lighting conventionally uses an elongated glass tube which is shaped and then filled with a gas energized by a high voltage to produce a colored, luminescent, sharply defined line of light. Different shapes, figures and colors are available in neon lighting; however, conventional neon lighting has several serious drawbacks. First, the production of neon lighting is an old art; skilled craftsmen who are able to bend and seal glass tubing containing a proper gas and insert proper electrodes are rare. Second, neon lighting is expensive. Third, neon lighting is fragile. Fourth, gas leakage may result if there is an imperfect fusion of metal and glass at the electrode. Fifth, the high voltage used may present certain hazards which result in use and environment restrictions. Sixth, neon is available in limited colors: blue, green, red, orange and white.

Despite these disadvantages, .neon has, however, become a new popular style and represents a new decorative trend.

OBJECTS OF THE INVENTION

It is an object of the invention herein to provide a simulation of a "neon look" in a polymeric system activated by an activating lamp which is useful for illumination, decorating enhancement, signage and other commercial applications. It is a further object to provide a "neon look" lighting product which is conveniently fabricated, safe in use, and not subject to building code restrictions that have heretofore inhibited the use of authentic neon lighting fixtures.

These and other objects will be evident when considered in view of the following description of the preferred embodiment taken in conjunction with the drawings in which:

BRIEF DESCRIPTION OF THE DRAWINGS

FIG. 1 shows the configuration of a "neon look" design or script on a flat panel.

FIG. 2A shows the relationship of the panel of FIG. 1 installed in a light box and FIGS. 2B and 2C show alternate design panel/light configurations.

FIGS. 3A and 3B respectively show a cross-section of the "neon look" light panel and a cross-section during the steps of manufacture.

DESCRIPTION OF THE PREFERRED EMBODIMENT

In its preferred embodiment, the manufacturing method of the invention is analagous in certain respects to the process conventionally employed in the manufacture of simulated stained glass which uses a transparent acrylic base panel to which colored polyester based materials are applied. In that Prior art process, a fluid ribbon of plastic material is applied to the base panel to define predetermined design segments within the plane of the panel. These defined segments are thereafter filled and/or colored with other transparent material to Produce the appearance of stained glass.

In the invention, however, the replication of a "neon look" using polymeric materials includes several discrete process steps. First, a base panel, preferably such as an acrylic panel comprising an extruded or cast copolymer of polymethylmethacrylate/polyethylacrylate, of predetermined size is provided. Preferably the acrylic material is one that does not include an ultraviolet absorber, but is rather a material that is relatively transparent to ultraviolet radiation. The design which will have the "neon look" appearance is first etched into a surface of the acrylic panel and a ribbon of liquid polyester film having a fluorescent ultraviolet activated pigment intermixed therein is applied to the etched area of the surface and allowed to cure. Other casting materials, such as epoxy resins, may be equally as suitable for mixing with a fluorescent pigment as is a polyester material and may be similarly employed. The panel is then mounted in a display area wherein it is subjected to "black" or ultraviolet light or is separately included in a light box. The following example describes the manner of producing the "neon look" sign illustrated in the figures.

EXAMPLE I

With reference to FIG. 1, a predetermined pattern or design 1 for a sign is created upon acrylic panel 2. For commercial uses, an acrylic panel having a scratch resistant surface is preferred. A suitable type of acrylic panel material has a nominal thickness of 0.125 inch and suitable panels are sold by various manufacturers under the trademarks Acrylite® FF or SAR Mirror or Clear Acrylic.

Sandblasting is a preferred etching process used to produce a surface to which the subsequently applied polyester ribbon will adhere, as well as to produce a sharply defined outline for the neon pattern. In the etching, a stencil of the pattern is provided and applied to the acrylic base panel. Suitable material from which a stencil may be formed includes the releaseable stenciling materials manufactured as "Continental Stencil," Styles 111, 112 or 123, by Anchor Continental Inc., 2000 S. Beltline Boulevard, Columbia, S.C. 29205. This stencil material has an intrinsic adhesive by which a completed stencil is applied over and temporarily bonded to the base panel. The open areas of the stencil permit the acrylic panel to be sandblasted to remove any abrasion resistant coating or mirror surface present on the acrylic panel and/or to "frost" the acrylic surface to a degree such that a translucent milky surface results to permit adhesion of a subsequently applied fluorescent polyester gel in the frosted areas.

After the panel with the stencil is sandblasted, a polyester gel containing the ultraviolet activated fluorescent pigments is then applied, preferably while the stencil remains on the panel. While many types of fast curing polyester compositions are suitable, a particularly useful polyester is Silmar Polyester Resin S-250 produced by the Silmar Division of Vistron Corporation, 12335 S. Van Ness Avenue, Hawthorne, Calif. 90260 and 3535 Latonia Avenue, Covington, Ky. 41015. This resin has good color, cures water white, is of medium viscosity and is promoted for room temperature cure. Tables I and II respectively set forth its uncured properties and curing data.

TABLE I

| Uncured Properties Liquid Resin at 77° F. | |
|---|---|
| Color | Pale Blue-Green |
| Viscosity, centipoise | 450 |
| Specific Gravity | 1.12 |
| Lbs. per gallon | 9.3 |
| Stability, 77° F. (covered) | 3-4 months |
| Stability, 100° F. (uncatalyzed) | 10 days |

TABLE II

| Curing Data Typical Gel Data 77° F.-50 gram casting | |
|---|---|
| Catalyst | Gel time, minutes |
| 0.4% MEK Peroxide | 24.0 |
| 0.8% MEK Peroxide | 13.5 |
| 1.0% MEK Peroxide | 12.0 |

To prepare a suitable casting material for the "neon look" appearance of the invention, to a measure of 100% by weight of polyester resin there is added 1% MEK Peroxide catalyst and 10% by weight in the same relative proportion of a dry fluorescent, oil-soluble powder, color, dye or pigment which is suitable for black light activation. Such fluorescent pigments which may be activated by ultraviolet radiation and are capable of being cast in a polymer gel are available from several sources, including Rosco, Iddings Dry Pigments, 36 Bush Avenue, Port Chester, N.Y. 10573, which markets such colorants as a "fluorescent" powder color. As referred to herein, these colored fluorescent materials added to the polymer gel are referred to as "fluorescent pigments." These proportions are not critical and may be modified by those experienced in colored polymer gel casting. It is noted that the pigment also serves as a thickener for the polyester gel.

This resin is prepared and then applied as a gel to the stenciled, frosted portions of the panel which are intended to simulate the neon appearance and is allowed to cure. After curing, the stencil is removed from the panel leaving the panel with its fluorescent ribbon produced from the gel casting.

The panel is then lighted by a fluorescent black light (ultraviolet) bulb such as a General Electric BL or BLB (black light or black light blue) bulb. Depending on ambient brightness the BL bulb is used in brighter areas, the BLB in darker areas.

It is preferred that the polyester neon ribbon be on the surface of the panel exposed to the ultraviolet light, because in some cases an ultraviolet absorber present in the panel may filter the black light and affect the fluorescense of the "neon look" ribbon. It is also evident from the figures that the ultimate appearance of the final sign will in most instances require that the stencil pattern applied to the panel be applied in a mirror image as shown in FIG. 2A so that the design when finished will properly appear as shown in FIG. 1.

In FIG. 2A, the finished sign is shown installed in a light box 3 with fluorescent bulb 5 providing back lighting. Other lighting configurations are shown in FIGS. 2B and 2C in which reference numeral 5 indicates the black light source and 6 illustrates the finished sign.

FIGS. 3A and 3B depict a cross section of the relative relationship of the base panel, stencil material and polyester ribbon. In FIG. 3A, the transparent base panel is shown at 10, and the neon fluorescent ribbon at 11. The abraded frosted interface between the panel and ribbon whereby the gel is bonded to the panel is shown at 12. It is preferred that the ribbon, upon curing, includes the convex, rounded top surface 13 which may enhance the fluorescent glow effect by reason of producing a lens effect in certain applications. As noted, the border, 14, between the panel and the sides of the gel cast ribbon should also be well defined so that a sharply defined image is created. In FIG. 3B, the relative relationship of the panel, polyester ribbon, with the stencil 20 thereon is shown during the casting and curing step for the polyester gel. After the gel ribbon is cured, the stencil 20 is removed to produce the cross section in FIG. 3A.

As may be evident, the process and combination of elements of the invention lends itself to many design opportunities and is not inhibited by the constraints that fragile glass tubes, limited colors and high voltage requirements have imposed upon the use of conventional neon lighting. For example, many different fluorescent effects or colors may be conveniently combined. Therefore, neon design possibilities are not specifically limited to the "ribbon" analagous to a simulated neon gas tube. Instead of a mirrored or transparent surface, a surface may be painted, frosted or otherwise treated to secure a special color effect. Multiple panels may be layered to produce a three dimensional effect. There are thus other applications that may be made of the invention which I intend to claim a follows.

What is claimed is:

1. A method of making a lamp simulating the appearance of a neon glow tube consisting of:

(1) providing a base panel;

(2) etching an abraded pattern in said base panel corresponding to an area of the panel in which it is desired that a neon glow be simulated;

(3) casting upon said pattern a polymeric gel material containing a fluorescent pigment and curing said gel material so that said gel material solidifies in a three dimensional form and intrinsically bonds to the surface of the base panel in the areas etched; and (4) mounting the panel having the cured material thereon adjacent to an activating lamp.

2. The method of claim 1 in which the step of mounting includes mounting the panel adjacent a fluorescent lamp.

3. The method of claim 1 in which the step of providing a base panel is a step of providing a panel that is transparent to ultraviolet radiation.

4. The method of claim 1 in which the step of etching is sandblasting.

5. The method of claim 1 in which the step of casting includes forming the three dimensional mass from a polyester gel.

6. The method of claim 1, claim 2, claim 3, claim 4 or claim 5 in which the step of casting includes providing a gel mass in a linear ribbon form simulating the shape of a neon tube.

7. A method of claim 1, claim 2, claim 3, claim 4 or claim 5 including mounting the panel in a box having sides extending relatively perpendicularly from the side edges of the panel.

8. The method of claim 7 in which the step of mounting further includes positioning the activating lamp within the volume defined by the sides of the box and positioning the surface of the base panel with the mass applied such that the mass faces the lamp towards the interior of the box and the outer facing surface of the base panel presents a flat surface.

9. The method of claim 4 in which the step of etching includes applying a stencil to the panel, and in the step of sandblasting, a frosted pattern in the base panel in areas predetermined by the stencil applied to the panel is created.

10. The method of claim 9 in which the step of applying the stencil to the panel is a step of temporarily securing the stencil to the panel by a releaseable adhesive.

11. The method of claim 1 including the step of mixing a polyester resin with a fluorescent pigment and catalyst to provide a polymeric gel material before the step of casting.

12. The method of claim 1 in which the step of etching the pattern includes etching a pattern in the form of a sharply defined outline corresponding to a ribbon form and the step of casting includes casting a ribbon of polymeric gel material upon said etched pattern.

* * * * *